(12) United States Patent
Sohn et al.

(10) Patent No.: US 7,691,762 B2
(45) Date of Patent: Apr. 6, 2010

(54) GLASS COMPOSITION FOR LOW TEMPERATURE SINTERING, GLASS FRIT, DIELECTRIC COMPOSITION AND MULTILAYER CERAMIC CAPACITOR USING THE SAME

(75) Inventors: Sung Bum Sohn, Kyungki-do (KR); Kang Heon Hur, Kyungki-do (KR); Eun Sang Na, Kyungki-do (KR); Tae Ho Song, Kyungki-do (KR); Han Seong Jung, Kyungki-do (KR); Chan Kong Kim, Kyungki-do (KR)

(73) Assignee: Samsung Electro-Mechanics Co.,, Kyungki-do (KR)

( * ) Notice: Subject to any disclaimer, the term of this patent is extended or adjusted under 35 U.S.C. 154(b) by 0 days.

(21) Appl. No.: 12/493,429

(22) Filed: Jun. 29, 2009

(65) Prior Publication Data

US 2009/0258231 A1  Oct. 15, 2009

Related U.S. Application Data

(62) Division of application No. 11/494,611, filed on Jul. 28, 2006, now Pat. No. 7,605,104.

(30) Foreign Application Priority Data

Jul. 29, 2005  (KR) .................. 10-2005-0069342

(51) Int. Cl.
*C03C 8/02* (2006.01)
*C03C 3/089* (2006.01)

(52) U.S. Cl. .................. 501/21; 501/26; 501/65; 501/66; 501/67; 501/139

(58) Field of Classification Search ............... 501/21, 501/26, 65, 66, 67
See application file for complete search history.

(56) References Cited

U.S. PATENT DOCUMENTS

| 5,362,687 | A | * | 11/1994 | Tokunaga ............... 501/21 |
| 5,482,902 | A | * | 1/1996 | Claunch et al. ............ 501/13 |
| 5,635,435 | A | | 6/1997 | Shibata |
| 6,924,246 | B2 | * | 8/2005 | Kato et al. ............... 501/16 |
| 2003/0007315 | A1 | | 1/2003 | Morita et al. |
| 2004/0106510 | A1 | | 6/2004 | Kim et al. |

FOREIGN PATENT DOCUMENTS

| EP | 518610 | * | 12/1992 |
| JP | 61-147404 | | 7/1986 |
| JP | 61295258 | * | 12/1986 |
| JP | 08-295559 | | 11/1996 |
| JP | 2000-185936 | | 7/2000 |
| JP | 2000-311828 A | | 11/2000 |
| JP | 2002-362970 | | 12/2002 |
| JP | 2004-182582 | | 7/2004 |
| JP | 2004-203626 | | 7/2004 |
| RU | 2016877 | * | 7/1994 |

OTHER PUBLICATIONS

Chinese Office Action, with English translation, issued in Chinese Patent Application No. 200610099129.8, mailed May 15, 2009.

* cited by examiner

*Primary Examiner*—Karl E Group
(74) *Attorney, Agent, or Firm*—McDermott Will & Emery LLP

(57) ABSTRACT

The invention relates to a glass composition and a glass frit adequate for low temperature sintering agent at 1,100° C. or less, and a dielectric composition and a multilayer ceramic capacitor using the same. The glass composition comprises $aLi_2O\text{-}bK_2O\text{-}cCaO\text{-}dBaO\text{-}eB_2O_3\text{-}fSiO_2$, in which a, b, c, d, e and f satisfy following relationships: $a+b+c+d+e+f=100$, $2 \leq a \leq 10$, $2 \leq b \leq 10$, $0 \leq c \leq 25$, $0 \leq d \leq 25$, $5 \leq e \leq 20$, and $50 \leq f \leq 80$.

3 Claims, 2 Drawing Sheets

GLASS COMPOSITION FOR LOW TEMPERATURE SINTERING, GLASS FRIT, DIELECTRIC COMPOSITION AND MULTILAYER CERAMIC CAPACITOR USING THE SAME

RELATED APPLICATIONS

This application is a divisional of U.S. application Ser. No. 11/494,611, filed Jul. 28, 2006, now U.S. Pat. No. 7,605,104 claiming priority of Korean Application No. KR 2005-0069342 filed Jul. 29, 2005, the entire contents of each of which are hereby incorporated by reference.

CLAIM OF PRIORITY

This application claims the benefit of Korean Patent Application No. 2005-69342 filed on Jul. 29, 2005, in the Korean Intellectual Property Office, the disclosure of which is incorporated herein by reference.

BACKGROUND OF THE INVENTION

1. Field of the Invention

The present invention relates to a glass composition, a glass frit, a dielectric composition and a multilayer ceramic capacitor using the same, and more particularly to a borosilicate system glass frit, which has high specific surface area, excellent high temperature fluidity and high solubility for $BaTiO_3$, a composition thereof, a dielectric composition containing the same and a multilayer ceramic capacitor using the same.

2. Description of the Related Art

Recently, along with rapid development in electric and electronic appliances for miniaturization, light weight, high performance and so on, multilayer ceramic capacitors used therein are also facing demands for smaller size and larger capacitance. In order to realize smaller size and larger capacitance, dielectric layers of such a multilayer ceramic capacitor are getting thinner while being stacked by a greater number. At present, $BaTiO_3$ dielectric layers are stacked by 470 layers or more with a thickness of 3 μm or less in order to realize a capacitor having an ultra high capacitance. Occasionally, a dielectric layer having a thickness of 2 μm or less is also demanded. In order to produce such a multilayer ceramic capacitor having an ultra high capacitance with a greater number of dielectric layers stacked on atop another, it is critical to make the dielectric layers as thin as possible. As the dielectric layers are getting thinner, a uniform micro-structure has become the most important factor to ensure in order to realize dielectric characteristics and reliability.

In addition to thin dielectric layers, continuity of internal electrodes also act as a very important factor to ensure in order to realize the capacitance of a multilayer ceramic capacitor. Ni electrode layers generally used for internal electrodes have a sintering temperature lower for about several hundred ° C. than that of ceramic dielectric material. Thus, sintering performed at a too high temperature increases the sintering shrinkage difference between the internal electrode layers and the dielectric layers, thereby causing delamination. Furthermore, heat treatment (sintering) performed at a high temperature leads to quick conglomeration of the Ni electrode layer, thereby causing electrode discontinuity. This as a result degrades capacitance while increasing short ratio. Therefore, in order to prevent such problems, it is preferable to sinter the Ni internal electrodes and the ceramic dielectric layers at a low temperature of 1,100° C. or less in a reducing atmosphere.

Furthermore, multilayer ceramic capacitors need a thermally stable capacitance in order to achieve high quality performance. The multilayer ceramic capacitors, according to their use, are required to satisfy X5R dielectric characteristics defined by the Electronic Industries Alliance (EIA) standard. According to this standard, capacitance variation (ΔC) should be ±15% or less at a temperature ranging from −55° C. to 85° C. (reference temperature 25° C.).

As conventional sintering agents used for fabrication of multilayer ceramic capacitors, $BaO\text{---}CaO\text{---}SiO_2$ system glass frit and $BaSiO_3$ system mixture powder are typically used. However, such sintering agents rarely promote sintering at a low temperature of 1,150° C. or less owing to their high melting point of 1,200° C. or more. Furthermore, such a conventional vitreous sintering agent accelerates liquid formation at a high temperature, which disadvantageously narrows a sintering temperature range for the fabrication of a multilayer ceramic capacitor. Japanese Patent Application Publication No. 2000-311823 discloses $(Ba, Ca)_xSiO_{2+x}$, where x=0.8 to 1.2, as a sintering agent for the fabrication of a multilayer ceramic capacitor. However, dielectric layers containing such sintering agent disclosed in this document have a sintering temperature exceeding 1,100° C. Thus, with the sintering agent disclosed in this document, it is difficult to produce a multilayer ceramic capacitor having ultra thin dielectric layers.

SUMMARY OF THE INVENTION

The present invention has been made to solve the foregoing problems of the prior art and therefore an object of certain embodiments of the present invention is to provide a glass composition for a low temperature sintering and a glass frit consisting of the same, by which $BaTiO_3$ dielectric material can be sintered uniformly at a low temperature of 1,100° C. or less and X5R dielectric characteristic can be satisfied.

Another object of certain embodiments of the present invention is to provide a dielectric composition using the glass composition of the invention which can be sintered at a low temperature of 1,100° C. or less while satisfying X5R dielectric characteristics.

Further another object of certain embodiments of the present invention is to provide a multilayer ceramic capacitor using the dielectric composition of the invention which can be fabricated by low temperature sintering at 1,100° C. or less while showing X5R dielectric characteristics.

According to an aspect of the invention for realizing the object, there is provided a glass composition comprising $aLi_2O\text{-}bK_2O\text{-}cCaO\text{-}dBaO\text{-}eB_2O_3\text{-}fSiO_2$, in which a, b, c, d, e and f satisfy following relationships: $a+b+c+d+e+f=100$, $2 \leq a \leq 10$, $2 \leq b \leq 10$, $0 \leq c \leq 25$, $0 \leq d \leq 25$, $5 \leq e \leq 20$, and $50 \leq f \leq 80$.

In the glass composition of the invention, it is preferable that a, b, c, d, e and f satisfy following relationships: $3 \leq a \leq 8$, $2 \leq b \leq 5$, $0 \leq c \leq 15$, $0 \leq d \leq 15$, $10 \leq e \leq 20$, and $55 \leq f \leq 75$. More preferably, a, b, c, d, e and f satisfy following relationships: $3 \leq a \leq 8$, $2 \leq b \leq 5$, $0 \leq c \leq 15$, $5 \leq d \leq 15$, $12.5 \leq e \leq 17.5$, and $60 \leq f \leq 75$.

According to another aspect of the invention for realizing the object, there is provided a glass frit of a glass composition expressed by a formula: $aLi_2O\text{-}bK_2O\text{-}cCaO\text{-}dBaO\text{-}eB_2O_3\text{-}fSiO_2$, where $a+b+c+d+e+f=100$, $2 \leq a \leq 10$, $2 \leq b \leq 10$, $0 \leq c \leq 25$, $0 \leq d \leq 25$, $5 \leq e \leq 20$, and $50 \leq f \leq 80$, the glass frit comprising ultra fine spherical powder having a particle size ranging from 100 nm to 300 nm.

In the glass frit of the invention, it is preferable that a, b, c, d, e and f satisfy following relationships: $3 \leq a \leq 8$, $2 \leq b \leq 5$, $0 \leq c \leq 15$, $0 \leq d \leq 15$, $10 \leq e \leq 20$, and $55 \leq f \leq 75$. More preferably, a, b, c, d, e and f satisfy following relationships: $3 \leq a \leq 8$, $2 \leq b \leq 5$, $0 \leq c \leq 15$, $5 \leq d \leq 15$, $12.5 \leq e \leq 17.5$, and $60 \leq f \leq 75$.

According to further another aspect of the invention for realizing the object, there is provided a dielectric composition comprising: a main component of $BaTiO_3$; and sub-components containing the above-mentioned glass composition of the invention, in which the sub-components comprise, based on 100 mole of the main component, 1.0 to 3.0 mole of the glass composition, 0.5 to 2.0 mole of $MgCO_3$, 0.3 to 1.0 mole of rare earth oxide and 0.05 to 1.0 mole of MnO, where the rare earth oxide is at least one selected from the group consisting of $Y_2O_3$, $Ho_2O_3$, $Dy_2O_3$, $Yb_2O_3$.

According to yet another aspect of the invention for realizing the object, there is provided a multilayer ceramic capacitor comprising a plurality of dielectric layers, a plurality of internal electrodes alternating with the dielectric layers and external electrodes electrically connected to the internal electrodes, in which each of the dielectric layers comprises the above-mentioned dielectric composition of the invention. Preferably, the internal electrodes may contain Ni or Ni alloy as a conductor.

According to certain embodiments of the invention, the $BaTiO_3$ dielectric slurry is sintered uniformly at a low temperature of 1,100° C. or less to reduce the difference of sintering shrinkage between the internal electrodes and the dielectric layers. This as a result can restrict conglomeration of the Ni internal electrodes, thereby decreasing short ratio. Furthermore, the multilayer ceramic capacitor can satisfy X5R dielectric characteristics.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
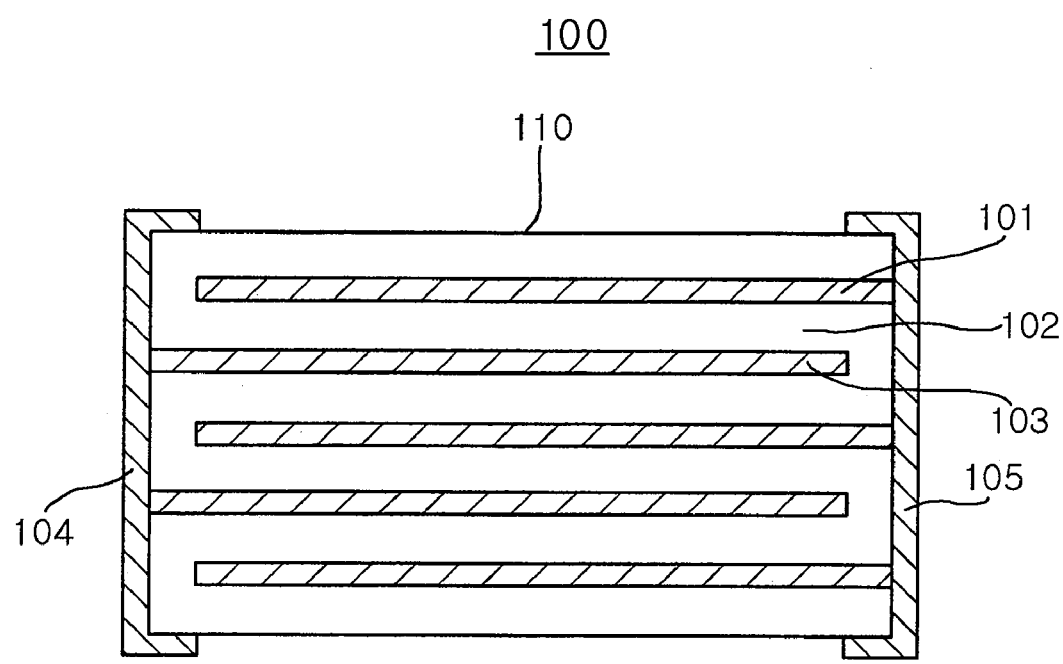
FIG. 1 is a cross-sectional view illustrating a multilayer ceramic capacitor according to an embodiment of the invention.

The present invention will now be described more fully hereinafter.

The inventors have noted an empirical fact that alkali-borosilicate glass forms a liquid phase at a low temperature of 1,000° C. or less while having a high solubility for $BaTiO_3$, and based on this fact, tested the possibility of alkali-borosilicate system glass as a sintering agent for BaTiO3 at a low temperature of 1100° C. or less. According to a glass composition of this invention, adding a suitable amount of alkali earth oxide (at least one of CaO and BaO) into an alkali-borosilicate system glass composition, which contains a suitable amount of alkali oxide, makes it possible to stabilize Temperature Characteristics Coefficient (TCC) of a multilayer ceramic capacitor and thus to satisfy X5R dielectric characteristics.

Glass Composition

The glass composition of this invention comprises lithium oxide ($Li_2O$), potassium oxide ($K_2O$), boron oxide ($B_2O_3$) and silicon oxide ($SiO_2$), and optionally comprises at least one of calcium oxide (CaO) and barium oxide (BaO).

The content of $SiO_2$ in the glass composition is in the range from 50 mole % to 80 mole % with respect to total 100 mole of $Li_2O$, $K_2O$, CaO, BaO, $B_2O_3$ and $SiO_2$. The $SiO_2$ content is preferably in the range of 55 mole % to 75 mole %, and more preferably, of 60 mole % to 75 mole %. $SiO_2$ has an atomic arrangement in which each silicon (Si) atom is surrounded by four oxygen (O) atoms, and connected via the surrounding O atoms with four adjacent Si atoms. Such $SiO_2$ is a glass network former acting as a critical factor for determining major properties of glass such as high temperature fluidity, melting point and solubility for $BaTiO_3$ powder. A $SiO_2$ content in the glass composition less than 50 mole % leads to poor solubility for the $BaTiO_3$ powder, thereby failing to improve low temperature sinterability. On the other hand, when the $SiO_2$ content exceeds 80 mole %, high temperature fluidity becomes poor and liquid is formed at a higher temperature. Thus, the glass composition is not adequate for sintering agent at a low temperature of 1,100° C. or less.

The content of $B_2O_3$ in the glass composition is in the range from 5 mole % to 20 mole %. $B_2O_3$ is a glass network former like $SiO_2$, acting as an important factor for determining the solubility of glass composition for the $BaTiO_3$ powder. $B_2O_3$ also acts as a flux to drop the melting point of glass while improving high temperature fluidity remarkably. In particular, for the purpose of improving high temperature fluidity, $B_2O_3$ is preferably added with a content of 5 mole % or more into the glass composition. At a $B_2O_3$ content exceeding 20 mole %, the glass structure may be weakened thereby degrading chemical stability and glass forming ability may be lowered due to crystallization.

The content of $Li_2O$ in the glass composition is in the range from 2 mole % to 10 mole %. $Li_2O$ is a glass network modifier, which acts to disconnect a glass network composed of $SiO_2$ or $B_2O_3$, thereby dropping the melting point of glass while improving high temperature fluidity. A $Li_2O$ content less than 2 mole % may drop high temperature fluidity of glass but excessively raise liquid forming temperature. At a $Li_2O$ content exceeding 10 mole %, it may be difficult to form glass owing to glass structure weakening and crystallization.

The content of $K_2O$ in the glass composition is in the range from 2 mole % to 10 mole %. Like $Li_2O$, $K_2O$ is a glass network modifier, which acts to disconnect a glass network composed of $SiO_2$ or $B_2O_3$, thereby dropping the melting point of glass while improving high temperature fluidity. In particular, when $K_2O$ is inputted together with other alkali oxide such as $Li_2O$, they complement each other (i.e., mixed alkali effect) thereby enhancing chemical endurance of glass while decreasing dielectric loss of dielectric material. At a $K_2O$ content ranging from 2 mole % to 10 mole %, glass may have a suitable high temperature fluidity and $K_2O$ may have a suitable complementary effect with $Li_2O$.

CaO and BaO contents in the glass composition is in the range from 0 mole % to 25 mole %. CaO is a glass network modifier, which acts to drop the melting point of glass but enhance the glass structure weakened by alkali metal oxide, thereby enhancing chemical endurance of glass. However, the drawback of CaO is to drop high temperature viscosity of glass sharply, and thus induce drastic sintering shrinkage to ceramic. BaO can drop the melting point of glass by the largest amount among alkali earth oxides, and in particular, smoothen high temperature fluidity variation of glass to prevent abrupt sintering shrinkage of ceramic. CaO and BaO also serve to stabilize capacity temperature characteristics of dielectric material. However, if added by excessive amount, CaO and BaO may lower sinterability. When at least one of the CaO and BaO contents exceeds 25 mole %, glass forming ability is degraded and low temperature sinterability of $BaTiO_3$ dielectric material is weakened remarkably.

Glass Frit

Glass frit of this invention is composed of the above-mentioned glass composition of the invention, and comprises ultra fine spherical powder having a particle size ranging from 100 nm to 300 nm. In order to form a thin dielectric layer having a thickness of 3 μm or less, a $BaTiO_3$ matrix having a particle size ranging from 150 nm to 300 nm is used in a dielectric slurry, and other sub-components except for sintering agents have a particle size in the range of several hundred nanometers or less. Therefore, when the glass frit added into the dielectric slurry has a particle size of 1 μm or more, it is difficult to sinter a thin dielectric layer uniformly with a thickness ranging from 2 μm to 3 μm. Furthermore, it is preferable to use spherical glass frit since a needle-shaped or agglomerate glass frit structure may cause nonuniform sintering. The glass frit of this invention can be produced for example by mechanically crushing glass flake of the above-mentioned glass composition and sequentially performing the vapor phase heat treatment.

A process for fabricating glass frit of this invention will now be described with reference to detailed examples, which are illustrative but not limiting this invention.

First, constituent powders ($Li_2O$, $K_2O$, CaO, BaO, $B_2O_3$ and $SiO_2$) are weighed to satisfy the above-mentioned composition of glass, mixed sufficiently, and melted at a temperature ranging from 1,400° C. to 1,500° C. The melt is quenched with twin rollers to form glass flake, which is then dry-crushed with a ball mill. Then, vapor phase heat treatment is performed on resultant glass particles to produce glass frit in the form of ultra fine spherical powder having a particle size of 100 nm to 300 nm.

The resultant glass frit is made of the above-mentioned glass composition, and can be used as a low temperature sintering agent for a multilayer ceramic capacitor. By using the glass frit of the above-mentioned glass composition as a sintering agent, a BaTiO3 dielectric layer can be uniformly sintered at a low temperature of 1,100° C. or less.

Dielectric Composition

The dielectric composition of this invention comprises a main component of $BaTiO_3$ and sub-components including glass composition as stated above, $MgCO_3$, rare earth oxide and MnO, in which the rare earth oxide is at least one selected from the group consisting of $Y_2O_3$, $Ho_2O_3$, $Dy_2O_3$, $Yb_2O_3$. The contents of the sub-components are, based on 100 mole of the main component ($BaTiO_3$), 1.0 to 3.0 mole of the glass composition, 0.5 to 2.0 mole of $MgCO_3$, 0.3 to 1.0 mole of the rare earth oxide and 0.05 to 1.0 mole of MnO.

By fabricating a multilayer ceramic capacitor using a dielectric composition comprising such components and contents, it is possible to realize a low temperature sintering not exceeding 1,100° C. as well as to ensure capacitance-temperature stability satisfying X5R dielectric characteristics.

Multilayer Ceramic Capacitor

FIG. 1 is a cross-sectional view illustrating a multilayer ceramic capacitor 100 according to an embodiment of the invention. Referring to FIG. 1, the multilayer ceramic capacitor 100 has a capacitor body 110 with dielectric layers 102 layered alternately with internal electrodes 101 and 103. External electrodes 104 and 105 are formed on the outer surface of the capacitor body 110, and electrically connected to corresponding internal electrodes 103 and 101, respectively.

The dielectric layers 102 contain the above-mentioned dielectric composition of the invention. That is, the dielectric composition of the dielectric layers 102 comprises main component of $BaTiO_3$ and sub-components including the above-mentioned glass composition. The sub-components comprise, based on 100 mole of the main component, 1.0 to 3.0 mole of the glass composition, 0.5 to 2.0 mole of $MgCO_3$, 0.3 to 1.0 mole of the rare earth oxide and 0.05 to 1.0 mole of MnO.

The thickness of the dielectric layer 102 is not specifically limited but may not exceed 3 μm per layer in order to realize an ultra thin, high capacity capacitor. Preferably, the dielectric layer 102 may have a thickness ranging from 1 μm to 3 μm. The conductor contained in the internal electrodes 101 and 103 is not specifically limited. However, since the dielectric layer 102 itself is reduction resistant, Ni or Ni alloy may be preferably used for the internal electrodes 101 and 103. Cu or Ni may be used for the external electrodes 104 and 105.

The multilayer ceramic capacitor 100 may be fabricated by a process similar to that of a conventional ceramic capacitor, which includes slurry preparation, green sheet forming, internal electrode printing, layering, compression, sintering and so on.

Figure 2:
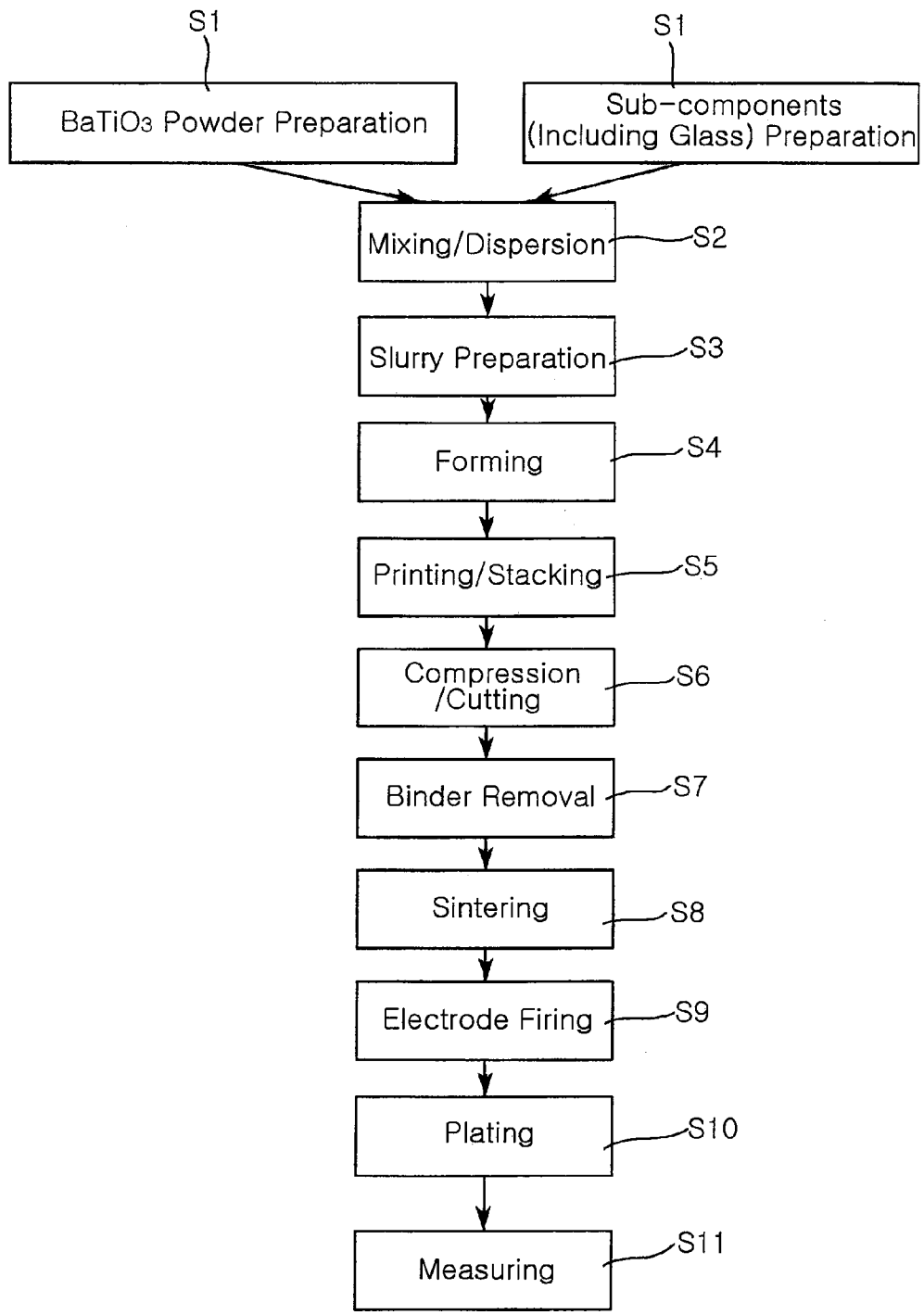
FIG. 2 is a flowchart illustrating a process of fabricating a multilayer ceramic capacitor according to an embodiment of the invention.

Hereinafter the process for fabricating a multilayer ceramic capacitor according to an embodiment of the invention will be described in detail with reference to FIG. 2. In steps S1 and S1', $BaTiO_3$ powder of main component and sub-component powers are prepared, respectively, by weighting them to satisfy the above-mentioned glass composition and dielectric composition. In detail, the sub-component powders comprise, based on 100 mole of the main component of $BaTiO_3$, 1.0 to 3.0 mole of the glass composition, 0.5 to 2.0 mole of $MgCO_3$, 0.3 to 1.0 mole of rare earth oxide and 0.05 to 1.0 mole of MnO. The glass composition is expressed by a formula: $aLi_2O\text{-}bK_2O\text{-}cCaO\text{-}dBaO\text{-}eB_2O_3\text{-}fSiO_2$, where $a+b+c+d+e+f=100$, $2 \leq a \leq 10$, $2 \leq b \leq 10$, $0 \leq c \leq 25$, $0 \leq d \leq 25$, $5 \leq e \leq 20$, and $50 \leq f \leq 80$, and the rare earth oxide is at least one selected from the group consisting of $Y_2O_3$, $Ho_2O_3$, $Dy_2O_3$, $Yb_2O_3$. Here, the glass composition may be provided as glass frit in the form of ultra fine spherical powder having a particle size of 100 nm to 300 nm. Then, the weighed powders are mixed and dispersed into an organic solvent in step S2, into which an organic binder is additionally mixed to prepare a dielectric slurry in step S3. The organic binder may adopt polyvinyl butyral, and the solvent may adopt acetone or toluene.

Then, the slurry is formed into (green) sheets in step S4. For example, the slurry may be formed into green sheets having a thickness of 3 μm or less. Then, internal electrodes of for example Ni are printed on the green sheets, and the green sheets printed with the internal electrodes are layered one atop another in step S5. In step S6, a stack of the green sheets are compressed and cut into separate chips (or green chips). Then in step S7, the green chips are heated at a temperature ranging from 250° C. to 350° C. to remove binder or dispersing agent therefrom.

With the binder removed, the stacks or green chips are sintered (fired) at a temperature ranging from 1,100° C. or less in step S8. Here, at a firing temperature exceeding 1,150° C., an internal electrode may be separated from a dielectric layer or a Ni electrode layer may form a conglomerate as in the prior art. This is directly associated with delamination of the internal electrode, which in turn reduces reliability. Accordingly, this invention preferably limits the sintering temperature not exceeding 1,100° C.

Then, paste for external electrode such as Cu and Ni is printed on the outside surface of the sintered stacks, and then fired to form external electrodes in step S9. A coat may be formed optionally on the external electrodes via plating in step S10. As a result, multilayer ceramic capacitors 100 as shown in FIG. 1 are fabricated. Then, the qualities of the multilayer ceramic capacitors may be evaluated by measuring several properties of the capacitors in step S11.

The inventors have found empirically, through various experiments, that the multilayer ceramic capacitors of the invention satisfy X5R characteristics and have excellent electric characteristics when made from the above-mentioned glass composition and dielectric composition.

EXAMPLES

This invention will be described in more detail with reference to following Examples, which are illustrative but not limiting. In the following Examples, before fabrication of commercially distributable chips having more layers (e.g., several hundred layers or more), specimens were made first with fewer layers of about 10 layers to observe their properties.

In order to produce glass having a composition of $aLi_2O$-$bK_2O$-$cCaO$-$dBaO$-$eB_2O_3$-$fSiO_2$, where $a+b+c+d+e+f=100$, $2 \leq a \leq 10$, $2 \leq b \leq 10$, $0 \leq c \leq 25$, $0 \leq d \leq 25$, $5 \leq e \leq 20$, and $50 \leq f \leq 80$, corresponding elements were weighed and mixed sufficiently to satisfy the composition of Table 1 below, and mixtures were melted at a temperature ranging from 1,400° C. to 1,500° C. Then, the melts were quenched with twin rollers to produce glass flakes, which were then dry-crushed and then subjected to vapor phase heat treatment to produce glass frits in the form of ultra fine spherical powder having a particle size of 100 nm to 300 nm. At the same time, a glass frit without an alkali oxide (such as $Li_2O$ and $K2O$) was prepared as a Comparative Example.

TABLE 1

| | Glass frit no. | Composition of glass frit (mol %) | | | | | |
|---|---|---|---|---|---|---|---|
| | | Alkaline oxide | | Alkaline-earth oxide | | Network former | |
| | | $Li_2O$ | $K_2O$ | CaO | BaO | $B_2O_3$ | $SiO_2$ |
| Inventive | A1 | 7 | 3 | | 10 | 5 | 75 |
| | A2 | 5 | 5 | | 10 | 5 | 75 |
| | A3 | 3 | 7 | | 10 | 5 | 75 |
| | A4 | 7 | 3 | | 20 | 5 | 65 |
| | A5 | 7 | 3 | 5 | 15 | 5 | 65 |
| | A6 | 7 | 3 | 10 | 10 | 5 | 65 |
| | A7 | 7 | 3 | 15 | 5 | 5 | 65 |
| | A8 | 7 | 3 | 20 | | 5 | 65 |
| | A9 | 7 | 3 | | 15 | 15 | 60 |
| | A10 | 7 | 3 | | 10 | 15 | 65 |
| | A11 | 7 | 3 | | 5 | 15 | 70 |
| | A12 | 7 | 3 | | 0 | 15 | 75 |
| | A13 | 7 | 3 | | 20 | 10 | 60 |
| | A14 | 7 | 3 | | 20 | 15 | 55 |
| | A15 | 7 | 3 | | 20 | 20 | 50 |
| Comp. | A16 | | | | 25 | 25 | 50 |

Then, the sub-components including the glass frits were weighed as in Table 2 below, and mixed and dispersed into an organic solvent.

TABLE 2

| | No. | Main component | Sub-components (mol % with respect to 100 mol of main component) | | | | |
|---|---|---|---|---|---|---|---|
| | | $BaTiO_3$ | $MgCO_3$ | Rare earth oxide | MnO | Sintering agent Type | Cont. |
| Comp. | 1 | 100 | 1.5 | 1.0 | 0.3 | A16 | 1.5 |
| | 2 | 100 | 1.5 | 1.0 | 0.3 | $BaSiO_3$ | 1.5 |
| | 3 | 100 | 1.0 | 0.7 | 0.1 | A4 | 3.1 |
| | 4 | 100 | 1.0 | 0.7 | 0.1 | A5 | 3.2 |
| | 5 | 100 | 1.0 | 0.7 | 0.1 | A6 | 3.2 |
| | 6 | 100 | 1.0 | 0.7 | 0.1 | A7 | 0.8 |
| | 7 | 100 | 1.0 | 0.7 | 0.1 | A8 | 0.8 |
| | 8 | 100 | 1.0 | 1.0 | 0.3 | A13 | 0.9 |
| Inventive | 1 | 100 | 1.5 | 1.0 | 0.3 | A9 | 1.5 |
| | 2 | 100 | 1.5 | 1.0 | 0.3 | A9 | 2.0 |
| | 3 | 100 | 1.5 | 1.0 | 0.3 | A10 | 1.5 |
| | 4 | 100 | 1.5 | 1.0 | 0.3 | A10 | 2.0 |
| | 5 | 100 | 1.5 | 1.0 | 0.3 | A11 | 1.7 |
| | 6 | 100 | 1.5 | 1.0 | 0.3 | A11 | 2.0 |
| | 7 | 100 | 1.5 | 1.0 | 0.3 | A12 | 1.5 |
| | 8 | 100 | 1.5 | 1.0 | 0.3 | A12 | 1.8 |
| | 9 | 100 | 1.0 | 1.0 | 0.3 | A14 | 1.5 |
| | 10 | 100 | 1.0 | 1.0 | 0.3 | A15 | 1.5 |

(Rare earth oxide is one of $Y_2O_3$, $Ho_2O_3$ and $Yb_2O_3$)

Then, an organic binder was additionally mixed to produce slurries, which were then printed on films to a thickness of about 5 μm to fabricate dielectric sheets. Next, internal electrodes of Ni were printed, and the dielectric sheets printed with the internal electrodes were stacked on atop another up to 10 layers. Dielectric sheets without any internal electrodes were layered on the top and bottom of the sheet stacks. The stacks were subjected to Cold Isostatic Press (CIP) at a temperature of about 85° C. under a pressure of 1,000 kg/cm² for about 15 mins, and then cut into specimens. The specimens were heat treated at a temperature ranging from 250° C. to 350° C. for 40 hours or more to fire and remove the organic binder, a dispersant and so on, and sintered in various temperatures ranging from 1,050° C. to 1,200° C. with an electric furnace controllable in temperature and atmosphere. Here, oxygen partial pressure in the sintering atmosphere was controlled in the range from $10^{-11}$ to $10^{-12}$ atm. After sintering, the specimens were printed with external electrodes of Cu, and subjected to electrode firing at a temperature ranging from 850° C. to 920° C., followed by plating, thereby completing specimen fabrication. After a predetermined time duration, electric properties of the fabricated specimen were determined.

The electric properties of the specimens were determined by measuring capacitance and dielectric loss under conditions of 1 KHz and 1 Vrms with a capacitance meter (Agilent, 4278A) and measuring insulation resistance under a rated voltage for 180 secs with a high resistance meter (Agilent, 4339B). Furthermore, temperature dependency of dielectric constant was measured based on variations in the range from −55° C. to 135° C. with a Temperature Characteristics Coefficient (TCC) test chamber (4220A). Dielectric constants according to the sintering temperatures were calculated based on the thickness of dielectric layers after being sintered. In the meantime, a high temperature load test was carried out by applying a DC voltage of 18.9 V at 150° C. and measuring the aging rate of insulation resistance. Test results are reported in Table 3 below.

TABLE 3

| No. | | ST (°C.) | DC | DL (%) | Res (Ωm) | TCC (85° C.) (%) | Remarks |
|---|---|---|---|---|---|---|---|
| Comp. | 1 | 1200 | 2800 | 6.7 | $6.7*10^9$ | -11.2 | |
| | | 1150 | — | — | — | — | Not sintered |
| | 2 | 1150 | 2900 | 4.5 | $8.7*10^8$ | -8.6 | |
| | | 1100 | — | — | — | — | Not sintered |
| | 3 | 1150 | 3450 | 10.9 | $7.9*10^6$ | 15.2 | Abnormal grain growth |
| | | 1100 | 2340 | 6.6 | $5.7*10^5$ | -4.5 | Not sintered |
| | 4 | 1100 | 2410 | 7.3 | $3.4*10^6$ | -1.9 | Not sintered |
| | 5 | 1100 | 2680 | 8.1 | $4.4*10^6$ | 1.4 | Not sintered |
| | 6 | 1100 | 2380 | 11.9 | $3.9*10^6$ | -1.7 | Not sintered |
| | 7 | 1100 | 2170 | 12.1 | $10.7*10^7$ | -1.1 | Not sintered |
| | 8 | 1100 | 2420 | 8.8 | $9.2*10^6$ | -4.7 | Not sintered |
| Inventive | 1 | 1120 | 3150 | 7.8 | $3.9*10^9$ | 2.7 | |
| | 2 | 1100 | 3015 | 7.4 | $2.7*10^9$ | 0.1 | |
| | 3 | 1100 | 3400 | 6.1 | $6.2*10^9$ | -3.2 | |
| | 4 | 1070 | 3200 | 5.9 | $5.9*10^9$ | -4.2 | |
| | 5 | 1100 | 3250 | 7.1 | $6.1*10^9$ | 1.2 | |
| | 6 | 1060 | 3150 | 6.8 | $3.7*10^9$ | -2.4 | |
| | 7 | 1100 | 3550 | 7.2 | $6.9*10^9$ | -1.8 | |
| | 8 | 1060 | 3310 | 6.7 | $5.2*10^9$ | -2.9 | |
| | 9 | 1100 | 3050 | 6.4 | $2.9*10^9$ | -4.8 | |
| | 10 | 1070 | 2800 | 6.1 | $8.9*10^9$ | -1.8 | |

Note)
ST: Sintering Temperature
DC: Dielectric Constant
DL: Dielectric Loss
Res: Resistivity As seen in Table 3 above, Examples 2 to 10 of this invention showed excellent sinterability at a low temperature of 1,100° C. or less. Especially, in Examples 3 to 9, dielectric constant and resistivity were excellent and TCC of capacitance was very stable. Accordingly, any commercially available capacitors with 400 layers or more, when fabricated from the specimens of Examples 2 to 10, are expected to satisfy X5R characteristics (-55° C. to 85° C., ΔC=±15% or less) also. These results of Inventive Examples are comparable with those of Comparative Examples 1 and 2 fabricated by using BaO—CaO—$SiO_2$ glass frit or $BaSiO_3$ system mixed powder, in which the specimens showed low sinterability at a temperature of 1,150° C. or less, and found unsuitable for sintering at a temperature of 1,100° C. or less.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

As set forth above, with the glass frit of the present invention, $BaTiO_3$ layers can be uniformly sintered at a low temperature of 1,100° C. or less. This as a result reduces sintering shrinkage difference between the dielectric layers and internal electrode layers as well as restrict Ni conglomeration, thereby minimizing internal electrode delamination. Moreover, a resultant multilayer ceramic capacitor can satisfy excellent electric characteristics together with X5R dielectric characteristics (EIA standards: -55° C. to 85° C., ΔC=±15% or less).

What is claimed is:

1. A glass frit of a glass composition expressed by a formula: $aLi_2O\text{-}bK_2O\text{-}cCaO\text{-}dBaO\text{-}eB_2O_3\text{-}fSiO_2$, where $a+b+c+d+e+f=100$, $2 \leq a \leq 10$, $2 \leq b \leq 10$, $0 \leq c \leq 25$, $0 \leq d \leq 25$, $5 \leq e \leq 20$, and $50 \leq f \leq 80$, the glass frit comprising ultra fine spherical powder having a particle size ranging from 100 nm to 300 nm.

2. The glass frit of claim 1, wherein a, b, c, d, e and f satisfy following relationships: $3 \leq a \leq 8$, $2 \leq b \leq 5$, $0 \leq c \leq 15$, $0 \leq d \leq 15$, $10 \leq e \leq 20$, and $55 \leq f \leq 75$.

3. The glass frit of claim 1, wherein a, b, c, d, e and f satisfy following relationships: $3 \leq a \leq 8$, $2 \leq b \leq 5$, $0 \leq c \leq 15$, $5 \leq d \leq 15$, $12.5 \leq e \leq 17.5$, and $60 \leq f \leq 75$.

* * * * *